July 24, 1951  A. L. JACKSON  2,561,867
REMOVABLE SECTIONAL TENDERIZING UNIT WITH CLEANING COMBS
Filed June 30, 1947  5 Sheets-Sheet 1

*INVENTOR.*
ALDRICH L. JACKSON
BY
ATTORNEY

July 24, 1951 A. L. JACKSON 2,561,867
REMOVABLE SECTIONAL TENDERIZING UNIT WITH CLEANING COMBS
Filed June 30, 1947 5 Sheets-Sheet 3

*INVENTOR.*
ALDRICH L. JACKSON
BY
ATTORNEY

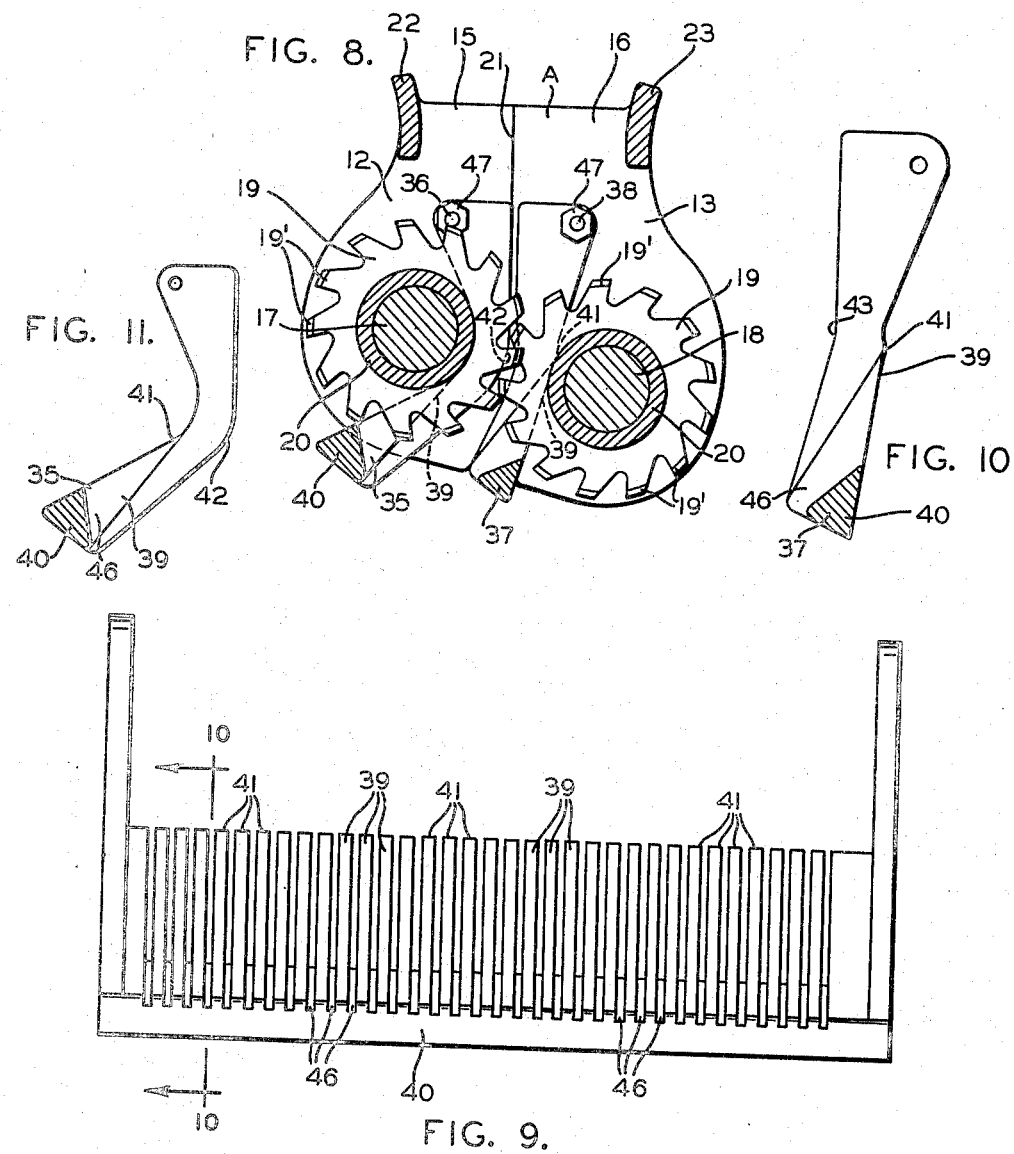

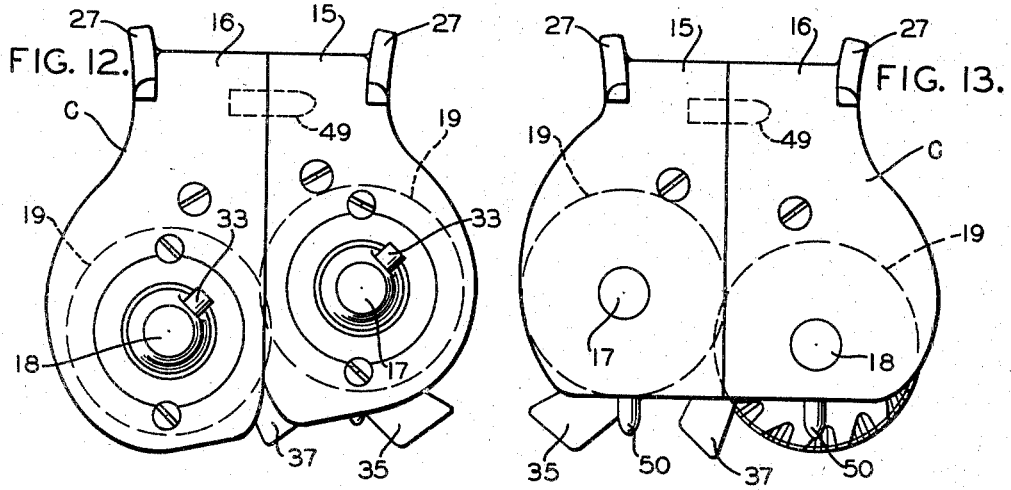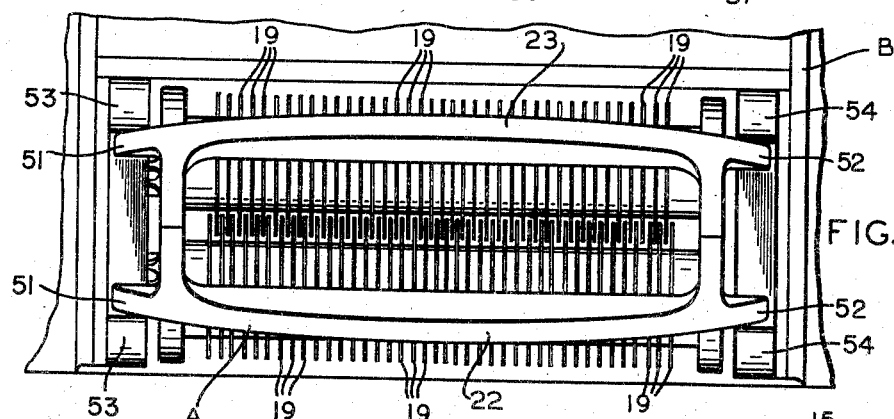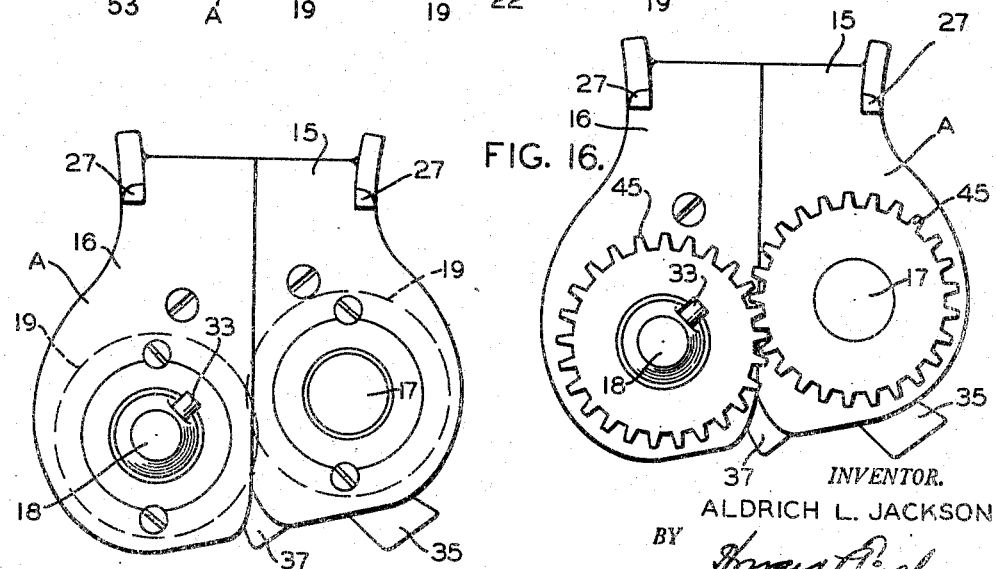

Patented July 24, 1951

2,561,867

UNITED STATES PATENT OFFICE 2,561,867

REMOVABLE SECTIONAL TENDERIZING UNIT WITH CLEANING COMBS

Aldrich L. Jackson, Minneapolis, Minn., assignor to Hobart-Federal Engineering Corporation, Minneapolis, Minn., a corporation of Minnesota Application June 30, 1947, Serial No. 757,965

20 Claims. (Cl. 17—26)

My invention relates to a sectional unit which forms a meat tenderizing means and which may be removed in its entirety by lifting the unit from a supporting casing.

The casing is adapted to enclose a power unit for driving the shafts of the tenderizer unit, and I provide a coupling for connecting the shafts of the tenderizing unit with the power unit. This coupling is a feature of the invention as it provides an easy means of connecting and disengaging the tenderizing rollers from the power unit.

A further feature resides in enclosing the entire power unit within a casing to conceal the same and to provide a casing of a streamlined nature having a central recess into which the tenderizing unit is adapted to be positioned when in operation and from which position the operator may lift the unit so as to remove the same. The power unit enclosed within the casing consists of an electric motor and driving gears which drive the clutch of the coupling to operate the tenderizing rollers as shown and described in my Patent No. 2,513,025. It will be apparent, however, that the driving means for operating the tenderizing unit may be of any suitable nature wherein the couplings are driven to operate the shafts of the tenderizing unit.

A feature resides in providing a tenderizing unit which may be readily placed into position to operate the same for the purpose of tenderizing meat and also to stitch various kinds of meat together into steak formation. It is also a safety feature to provide a tenderizing unit wherein, if the operator should accidentally get his hand caught in the tenderizing blades of the unit, the act of withdrawing his hand from same will automatically lift the tenderizing unit away from the driving gear coupling, and thus the tenderizing unit will immediately stop operating. As the tenderizing unit is lifted from the driving coupling means, it will automatically open so that in case of an accident where anything is caught in between the blades, the act of lifting the blades will not only stop the operation of the tenderizing blades but will separate the tenderizing rollers from each other, giving an additional safety feature to my tenderizing unit.

A further feature of my tenderizing unit resides in connecting the frame portions thereof at one end with a separable hinge or cleat so that the tenderizing rollers which are supported in the frame portions may be separated from each other, which allows easy cleaning of the unit and gives free access to both the inner and outer sides of the cutting blades, permitting thorough cleaning, adjusting, and also giving free access to the stripper members when the sections are separated.

A further feature of my new tenderizing unit resides in freely hinging stripper combs, one of which may be pivoted to each of the frame sections of the unit and which swings freely in a floating manner to operate between the thin cutting blades. The stripper combs may be removed when desired. Each of the combs is provided with scraper edges that bear against the hubs of the rollers to maintain the hubs of the rollers clean of any meat particles or sinews and at the same time extend in stripper formation between the thin cutting blades to strip and guide the meat which is being tenderized as it passes through the unit.

It is also a feature to provide a tenderizing unit which is formed with hand-engaging guard rails extending across the top of the roller supporting frame sections and which flare outwardly to give an easy hand grip for safety in cleaning and which also provide guards above the cutting discs to protect the operator. These hand rails also form a chute through which the meat is dropped into the tenderizing rollers in the operation of the same.

A further feature resides in projecting the hand rails on the sections of the tenderizer unit beyond the vertical end walls which form the bearings for supporting the rollers to provide a means of engaging against a shoulder in the casing which supports and guides the unit and permits a rocking motion in withdrawing or inserting the unit, whereas on the opposite end of the unit I provide a dowel pin which projects into a recess in the casing to align the unit in operating position. The casing is formed with shoulders which engage the projecting ends of the top rails to guide the unit in and out of operating position. The driving couplings also help to maintain the unit in closed position and prevent the separating of the rollers while the unit is held in the supporting case.

A further feature resides in providing a stripper comb for the cutting discs with wedge-like fingers or teeth having an inclining angle formation at their base adapted to form channels over the cross bar which is integral with the teeth. The channels between the teeth provide unobstructed free passageways for the movement of the meat passing over the integral bar of the comb. The wedge-like teeth provide graduated depth to the channels in order to prevent the sinews and strings of meat from being drawn by the rotating discs to the reverse side of the stripping surface. Thus I provide means for preventing strings of meat overhanging and adhering to edges on the reverse side of the stripping combs.

The formation of my stripper comb gradually withdraws the sinews and strings onto the inclining angle at the base of the teeth, thereby providing a series of free ending unobstructed channels over the connecting bar. The comb may be removably mounted as a stripper unit in which the rotating cutter discs operate, or it may be hingedly supported with a free floating movement.

It is also an object of my tenderizing unit to provide a single driving means for one of the shafts of the tenderizing unit, the other shaft of the unit acting as the idler, and owing to the formation of the cutting teeth on the rollers of the shafts, the roller which operates from the power drive will cause the idle roller with the cutter disc teeth to rotate, thereby causing draw cuts to form in the meat passing between the rollers in the tenderizing process. The cutter knives on the rollers of the unit overlap and thus the roller which is being driven by the power unit will cause the idle roller with its cutting knives to rotate like a wringer as the meat is drawn through the tenderizer. It is also a feature that the meat is drawn through the tenderizing rollers by the rotation of the rollers toward each other. Therefore, either one or both of the rollers may be directly connected with the power driving unit within the casing, or one of the rollers may be driven from the power driving unit and the other roller driven by a gear connection with the first roller so as to provide a positive driving means between the rollers.

It is also obvious that gears can be placed on either of the cutter shaft ends to drive the discs in wringer fashion, the gears to mesh upon closing the sectional unit and connected to a single driving means (power driving unit) to operate one of the shafts.

In the drawings forming a part of this specification:

Figure 8 is a section on the line 8—8 of Figure 3.

Figure 9 illustrates an enlarged side view of the back stripper member of the tenderizer.

Figure 10 is a section on the line 10—10 of Figure 9.

Figure 11 is a section similar to Figure 10 through the forward stripper member.

Figure 12 is an end view of an alternative construction of the sectional tenderizing unit.

Figure 13 is a similar view to Figure 12 looking at the opposite end of the unit but with the end members at the driving end not shown.

Figure 14 is a plan view of the unit shown in Figures 12 and 13, showing a portion of the casing which supports the unit.

Figure 15 is an end view showing an alternative form of the unit illustrating one of the shafts with a clutch pin to connect the same to the driving means.

Figure 16 is an end view of a further alternative construction of the unit showing one of the shafts thereof with a clutch pin adapted to connect the shaft with the driving means of the machine and showing the other shaft of the unit connected by intermeshing gears to provide means for driving both shafts of the sections of the unit in unison.

Figure 1:
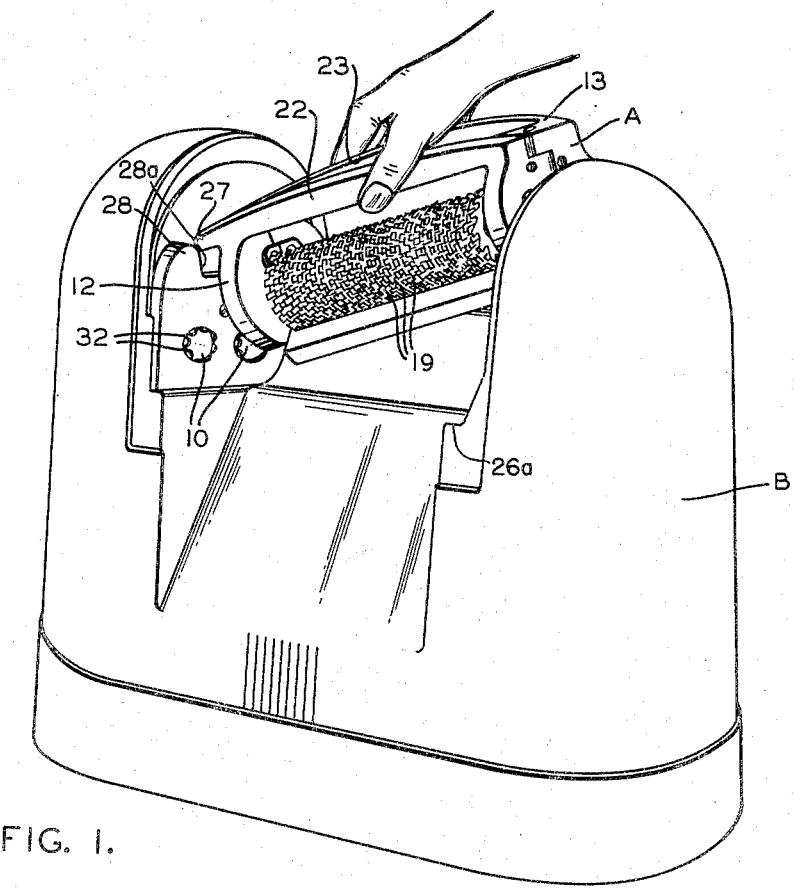
Figure 1 is a perspective view of my tenderizer unit showing the operator in the act of inserting or removing the same from the casing which supports it in operation and which houses the power drive for operating the unit.
Figure 2:
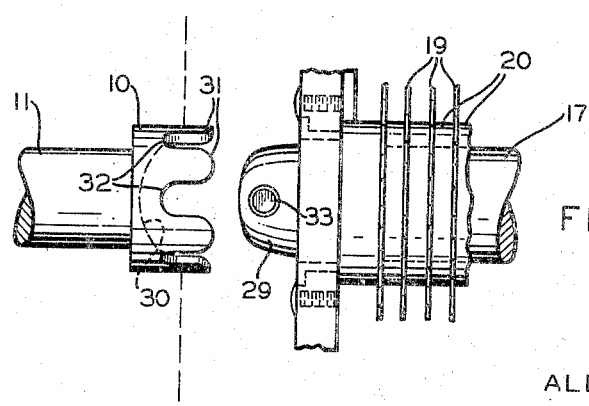
Figure 2 is an enlarged detail of the clutch connection for the shaft of the unit and a portion of the power shaft which operates the unit.

The drawings illustrate my stripper unit A which is shown in Figure 1 being inserted or removed from the supporting casing B. The casing B is adapted to support the tenderizing unit A in operative position as illustrated diagrammatically in Figures 3 and 4, where only a portion of the casing is illustrated.

The casing B is adapted to enclose an electric motor together with the driving belt and gearing as shown and described in my Patent No. 2,513,025. The power unit within the casing B is adapted to drive the clutch heads 10 which are mounted on the ends of the shafts 11.

The tenderizing unit A is formed with sectional frame members 12 and 13. The frame sections 12 and 13 are pivotally secured by a key such as hinge 14 at one end of the frame sections. The frame sections 12 and 13 are formed with parallel ends walls 15 and 16 respectively which are adapted to support the shafts 17 and 18 respectively of the frame sections 12 and 13. The shafts 17 and 18 rotate freely in the end walls 15 and 16 and are adapted to support a series of tooth-like cutter blades 19. The cutter blades 19 are held spaced apart on the shafts 17 and 18 by collar spacers 20. The blades 19 are clamped rigidly between the respective collar spacers 20 which form hub portions between each of the cutter blades 19. Each shaft 17 and 18 supports a multiplicity of cutter blades 19 as will appear in the respective figures of the drawings, and the tooth-like formation of the cutter blades may be in any desired form with the outer ends of the teeth of the blades formed with a sharp cutting edge 19'. The cutting edge 19' is formed by bevelling the ends of the teeth of the blades 19 on either side thereof, and may be sharpened from time to time by placing a V-shaped sharpening tool between the respective blades as they are rotated in the machine. It is desirable that the blades 19 be kept sharp so that the blades will act as a series of knives to form draw cuts or slits in the body of the meat or food material passed through the tenderizing unit.

The shafts 17 and 18 are positioned in the respective sections on the unit A, spaced apart in a manner so that the teeth of the blades 19 overlap sufficiently to penetrate into the meat passing between the blades in the tenderizing operation. The blades 19 with the supporting shafts 17 and 18 may be termed as a whole as tenderizing rollers which are adapted to be rotated toward each other in wringer-like operation. Thus when meat is to be tenderized by passing through the unit A, it is dropped down in contact with the teeth of the tenderizing rollers which draw the meat through the tenderizer A and form draw cuts or slits in the body of the meat by the sharp knife-like cutting edges 19'.

Figure 3:
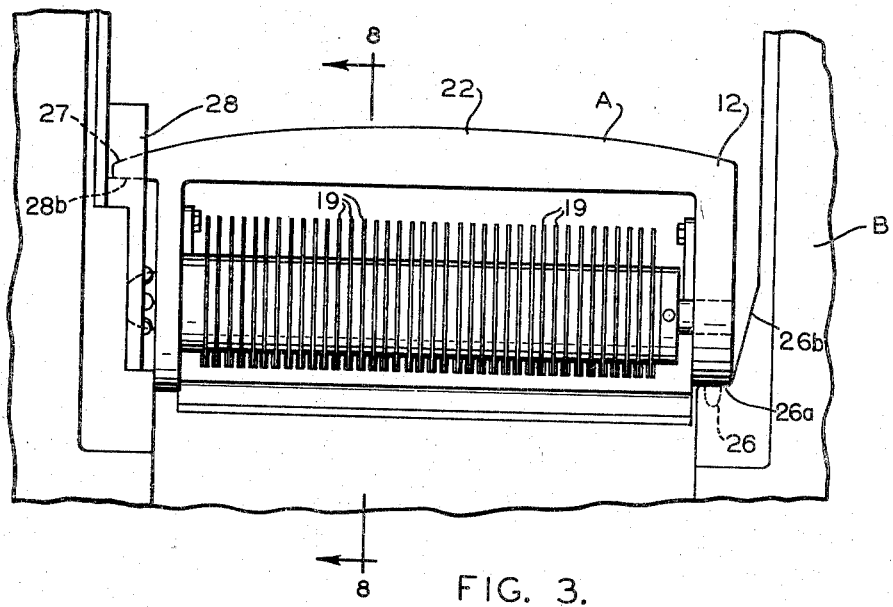
Figure 3 is a front view of my tenderizing unit showing it in place in the supporting casing, only a portion of the casing being illustrated.
Figure 4:
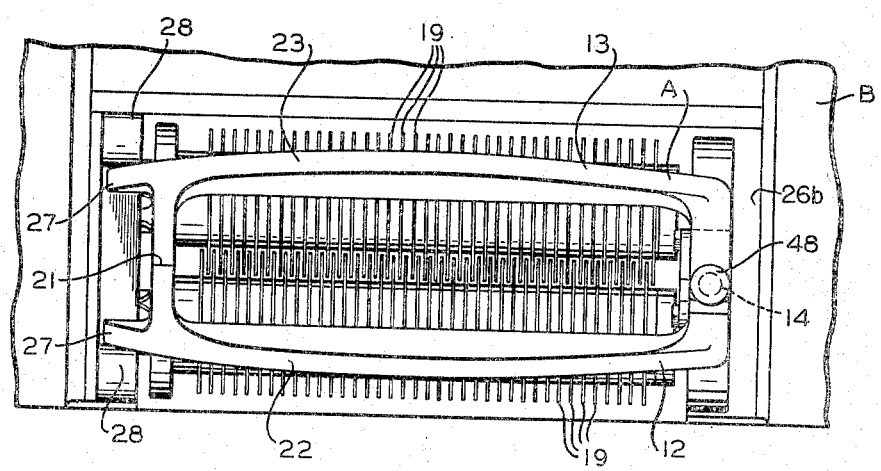
Figure 4 is a plan view of the unit held in operating position in the supporting casing, only a portion of the casing being illustrated.
Figure 5:
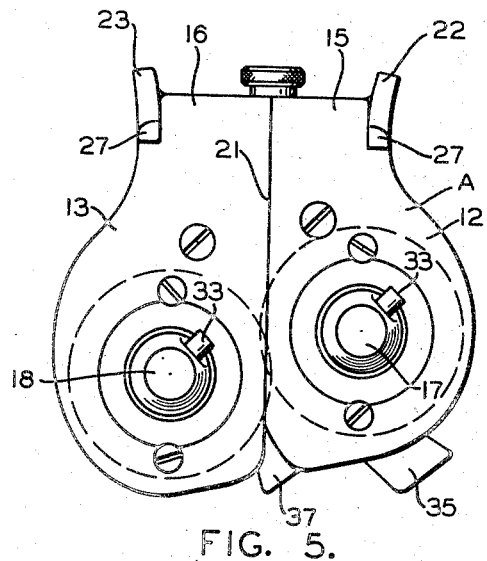
Figure 5 is an end view of the tenderizing unit removed from the supporting casing looking toward the ends of the shafts of the unit which engage with the power clutch.
Figure 6:
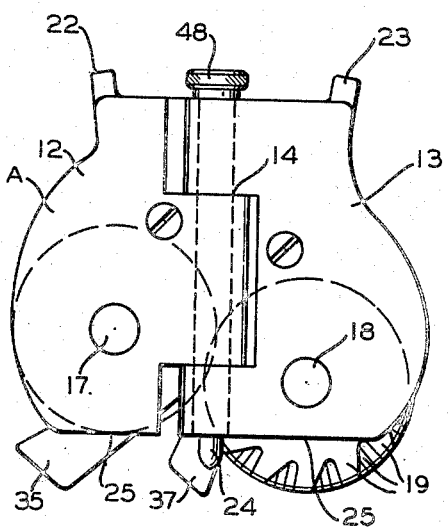
Figure 6 is an end view of the tenderizing unit in the opposite direction to that shown in Figure 5 but with the end members at the driving end not shown.
Figure 7:
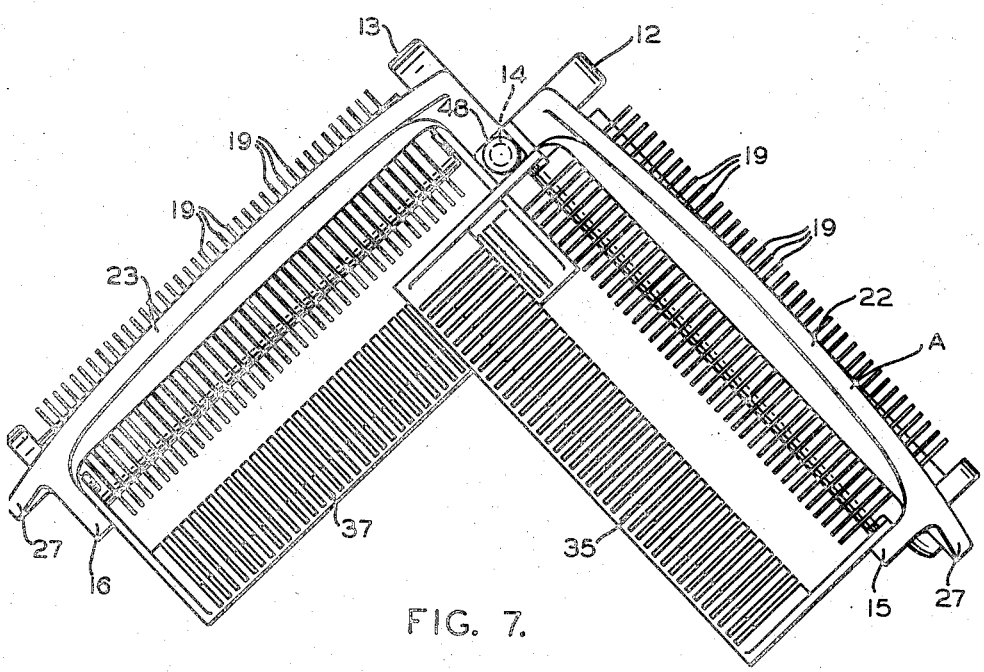
Figure 7 is a plan view looking down on the tenderizing unit and showing it opened on its hinge with the strippers moved away from the cutting blades of the unit.

The frame sections 15 and 16 are pivoted together at 14 as illustrated in Figures 4, 6, and 7, to permit the tenderizer to be opened into a cleaning position as illustrated in Figure 7. When the frame sections 15 and 16 are brought into closed position, the free ends thereof abut along the straight vertical line 21 which is formed by the straight surfaces on each of the walls 15 and 16 at their free ends, as illustrated in Figures 4, 5, and 8. This straight edge at the point 21 forms a bearing point for the free ends of the frame sections 15 and 16, and when these portions are in this position the unit A is closed and is adapted to be inserted into the supporting casing B as illustrated in Figures 1, 3, and 4. The parallel end walls 15 and 16 extend upwardly above the position of the tenderizing rollers with the blades 19, and guard rails 22 and 23 are formed integral with the end walls 15 and 16 respectively. The guard rails 22 and 23 extend along above the cutter blades 19 of the tenderizing rollers and are curved to extend outwardly at the top and inwardly at the bottom rib, providing an open chute portion in the tenderizing unit A above the rollers through which the material to be tenderized is dropped into engagement with the blades 19.

The members 22 and 23 provide rails which may be engaged by the hand of the operator as illustrated in Figure 1 to lift the unit A from its supporting casing B, or to insert the unit therein. When the operator engages the rails 22 and 23, the act of gripping the same tends to hold the sections 12 and 13 of the unit in closed position. The pintle 24 of the hinge 14 extends below the bottom edges 25 of the unit A and is adapted to fit into the recess 26 formed in the ledge 26a of the supporting casing B upon which the bottom edges rest and thus holds the hinged end of the unit in operative position in the casing.

The rails 22 and 23 extend beyond the end walls 15 and 16 to form projecting lugs 27 which engage against the shoulders 28 formed in the casing B and are then lowered between the side walls 28a until the bottom of the lugs rest upon the shelf 28b. Thus the free ends of the frame sections 12 and 13 are maintained in closed position by the sides of the lugs 27.

To place the unit in the machine the bottom of the lugs 27 are placed upon the shelf 28b and the unit is then swung into place, the shaft coupling members fitting into the clutch heads 10 and the lower end of the pintle 24 fitting into the recess 26 while bottom edges 25 of the frame seat upon the ledge 26a. The coupling members thus also maintain the unit in operative position. The inclined face 26b adjacent the ledge 26a affords clearance to swing the end of the unit A to and from the ledge 26a, when the unit is pivoted around the lugs 27.

The ends of the shafts 17 and 18 at the free end of the unit A project through the walls 15 and 16 and are formed with an arcuated surface 29 which is adapted to fit into the recess 30 formed in the clutch heads 10. The clutch heads 10 are formed with a series of bevelled teeth 31 between which I provide recesses 32 for receiving the pin 33 projecting from the end 29 of the shafts 17 and 18. The outer ends of the teeth 31 are rounded off and the rails 32 have straight parallel sides for receiving the pins 33 as the unit A is inserted into the supporting casing B. In the act of inserting unit A in operative position in the casing B, the pins 33 will automatically find the recesses 32 and as the unit A settles into operative position the pintle 24 will enter the recess 26, thus positioning the unit A horizontally supported within the casing B in operative position. When in this position the clutch heads 10 will drive the shafts 17 and 18 and cause the cutting discs to rotate toward each other, whereupon the meat or other material may be tenderized or stitched together by the cutters 19 as it is drawn through the tenderizer.

While I have shown two clutch heads 10 in the drawings as illustrated in Figure 1, it will be apparent that only one clutch head is necessary to operate the tenderizer unit A when gears are attached to both of the shaft ends of the unit A and one clutch head 10 is used on one of the shafts as illustrated in Figure 16. Thus both of the shafts 17 and 18 are driven in unison through the gears 45.

When it is desired to stitch two different kinds or pieces of meat together, it is only necessary to drop the meat between the guard rails 22 and 23 into contact with the teeth of the rollers which will penetrate into the body of the meat and stitch the same together. This operation is efficient in attaching pieces of meat together, and at the same time tenderizing the meat without crushing it owing to the draw cutting action of the blades 19. In this manner meat may be tenderized by my unit without losing or destroying the juices in the particles of meat and yet thoroughly slitting the meat fibers so that the heat may enter the body of the meat in preparing the meat for eating.

An important feature of my tenderizer A resides in the hingedly supported floating strippers which automatically strip the meat from the blades and at the same time keep the spacer hubs clean of any particles of meat. Each frame section 12 and 13 is provided with a floating stripper. The front frame section 12 is adapted to support the stripper member 35 which is pivotally supported on its upper end at 36. The frame section 13 supports the stripper member 37 which is pivotally supported at 38. The lower ends of the respective strippers 35 and 37 extend or hang free in a floating manner to permit the respective strippers to be moved toward the shafts 17 and 18. Each stripper is formed with a series of inclined teeth 39, and the lower free ends of the respective strippers are connected by an integral bar portion 40 which has a series of inclined channels 46 at the base of the teeth. The inclined ends 39 extend between the blades 19 and the sharp ends 41 bear on the hubs of the washers 20. When meat is tenderized by passing it through the tenderizer A it will cause the strippers 35 and 37 to move in a manner to press the sharp edges 41 against the hubs of the spacer collars 20, thus automatically scraping the particles of meat or sinews from the hubs and between the respective blades 19. In this manner the strippers act to clean the space between the respective blades 19. The stripper 35 is formed with a curved edge 42 which bears lightly against the surface 43 of the stripper 37 when the unit A is in closed position to separate the free ends of the respective strippers 35 and 37 as illustrated in Figure 8. However, the strippers have a certain amount of free movement so that the sharp edges 41 can always be automatically moved against the surfaces of the washers 20 to keep them clean and to clean the spaces between the cutter discs 19 by the respective teeth 39 of the strippers.

The strippers 35 and 37 are removably secured to the respective sections 15 and 16 by means of the nuts and bolts 47 which support the strippers at the pivot points 36 and 38 respectively as illustrated in Figure 11.

When the unit A is removed from the supporting casing B, the sections 15 and 16 may be completely separated from each other by removing the pintle 24 by engaging the head 48. This permits the sections 15 and 16 of the tenderizing unit to be thoroughly cleansed and also permits the removal of the striper combs 35 and 37.

In Figures 12, 13 and 14 I have illustrated an alternative form of my tenderizing unit A. In this form the sections 15 and 16 are not connected together by a hinge such as 14, but instead pins 49 act as dowel pins or keys to hold the sections 15 and 16 in alignment while they are being inserted or removed from the casing B as illustrated in Figure 1.

Further, I provide dowel pins 50 projecting from the lower surface of the respective sections 15 and 16 (as illustrated in Figure 13), and these pins enter a complemental recess formed in a shelf on the casing B similar to the shelf and recess 26a and 26 shown in Figure 3. These dowel pins assist in holding the sectional unit A in operative position in the case.

In the alternative form illustrated in Figures 12 to 14 inclusive, the top rails 22 and 23 are extended on each end to provide lugs 51 and 52 which engage shoulders 53 and 54, respectively at either end of the unit C as illustrated in Figure 14. Thus the separable unit A illustrated in these Figures 12 to 14 inclusive is held firmly in place during operation and while it is being driven by the power means within the casing B through the clutch heads 10 which engage the respective lugs 33 on the ends of the shafts 17 and 18 of the sections.

To place the unit in the machine the hand holds or rails 22 and 23 are grasped by the operator to thereby hold the unit together. While thus held the lugs 27 on the end of the unit in which the shaft driving means are mounted are placed on the shelf 28b and the unit is then swung into place, the shaft coupling members fitting into the clutch heads 10 and the pins 50 fitting into the recesses and the bottom edges 25 rest upon the shelf, as in the other embodiment.

Figure 15 is an end view of an alternative construction where I employ a single clutch pin 33 on the end of the shaft 18 of the unit A. The other shaft 17 acts as an idler shaft and is caused to rotate by the passage of meat through the tenderizer by virtue of the rotation of the shaft 18 and the blades 19 carried by said shaft. In this respect the alternative form of Figure 15 differentiates from the driving of the shafts 17 and 18 in the preferred form of my construction. Nevertheless I desire to have it understood that the unit A may be operated efficiently by the single driving means.

In Figure 16 I have illustrated a further alternative form of my tenderizing unit A and in this form the shaft 18 is driven through a clutch pin 33 carried by the outer end of the shaft, and the shaft 17 is connected to the shaft 18 by the gears 45. Thus by a single driving connection on the end of the shaft 18 with the power unit within the casing B the shafts 17 and 18 are rotated in unison which in turn drives the toothed blades 19 rotating toward each other like wringer rollers, thereby tending to draw the meat between the rollers formed by the blades 19 and the shafts 17 and 18.

Meat passed through my tenderizing unit A will be thoroughly tenderized by severing the fibers without crushing, and any of the sinews or stringy portions of the meat which may tend to collect on the hubs of the shafts 17 and 18 are automatically cleared from the same by the teeth 39. Furthermore, the sinews and stringy particles of meat which might otherwise collect in the channels 46 are carried out of the channels owing to the inclined formation of the same and by reason of the action of the blades 19 operating in these channels as well as the passing of the meat between the stripper units and over the channels 46.

It will be apparent that my tenderizing unit operates in a self-cleaning manner, keeping the hubs of the shafts 17 and 18 clean at all times and clearing the strippers of any particles of meat which might otherwise tend to clog the same in the operation of my tenderizing unit. In a machine of this character used to tenderize uncooked meat it is essential that the same be sanitary in every respect, and furthermore it is of primary importance that the tenderizing blades, strippers, and sections of the tenderizing unit be freely accessible for cleaning and separating. I have accomplished this by the sectional tenderizing unit made up of the sections 15 and 16 which may be easily separated one from the other, giving free access for cleaning or for the replacement of parts when it is desired.

It is an important feature of my tenderizing unit to provide stripper units wherein the angle of the channels inclines in a manner to urge the meat passing between the teeth of the same to return toward and onto the surface of the comb. The pair of stripper combs in my tenderizer unit forms an outlet chute to guide the meat out of the rollers of the tenderizer.

I claim:

1. A tenderizing unit for meat including sectional frame portions, tenderizing rollers supported by each of said frame sections, dowel pin means at one end of said unit for anchoring that end of the unit in a supporting casing, releasable members projecting from the other end of said frame sections from each of said rollers for driving said rollers when supported in the casing and adapted to hold the frame sections together at the driving ends of said rollers, and hand rails formed on said frame sections projecting above said tenderizing rollers adapted to provide hand-engaging means for lifting said unit from the supporting casing and providing protective guard rails above said tenderizing rollers.

2. A meat tenderizing unit including sectional frame portions, a casing hinge means connecting one end of said frame sections, lug receiving and supporting shoulders formed in said casing, lugs projecting from the other ends of said frame sections adapted to guide said other ends of said frames together into operative position against said shoulders, power driving means within said casing for said unit, processing rollers supported in said frame sections, clutch means formed in said casing and on the ends of said rollers for holding said frame sections together and operated by the power means within said casing adapted to separably connect the ends of said processing rollers when positioned in said casing and hand rail means projecting along the upper portion of said frame sections for lifting said unit from said casing, said hand rail means forming a receiving chute for guiding material into said processing rollers, the sections of said unit swinging apart on said hinge means to separate the processing rollers from each other whereby said unit may be thoroughly cleansed.

3. A sectional meat tenderizing unit comprising a pair of rollers, each roller made up of a series of spaced apart cutters, a shaft for supporting said cutters, a frame for supporting said shaft, hinge means for connecting said frames of said respective rollers together on one end, and a removable pintle in said hinge means whereby said sectional tenderizing units may be separated from each other.

4. A meat tenderizing machine having a casing and a sectional meat tenderizing unit, said unit including sections separable from each other and hinged on one end by a key from which the sections are separable, said unit being formed with a frame having ends for supporting shafts, shafts supported in said frame, a driving connection on one end of each of said shafts, a series of cutter discs mounted on said shafts, and lugs projecting from the ends of said frame of said sections adapted to support said tenderizing unit, the lugs on the ends of the frame in which the shaft driving connections are supported being also adapted to support the unit when it is placed into and moved out of operative position in the casing by swinging the opposite end of said unit around said driving connection end.

5. A sectional meat tenderizing unit including a pair of shafts, frames supporting said shafts, means for separably hinging said frames on one end to position said shafts parallel to each other, a series of tenderizing blades supported by said shafts and spaced apart, clutch ends formed on said shafts adapted to engage power means to operate said shafts and thereby operate said blade discs to tenderize food passed between said shafts, and projecting lugs formed on the ends of said frames supporting said shafts which are adapted to engage on supporting shelves to hold said tenderizing unit in operative position.

6. A removable unit for meat tenderizing means including a pair of cutting rollers, sectional frame members for supporting said rollers, means for driving said rollers toward each other, and a hand guard rail extending longitudinally across the top of each of said frame members and above said tenderizing rollers providing combined means for lifting said unit from its operating position and for handling the separated sections and also providing a meat directing chute through which meat is dropped into said tenderizing rollers.

7. In a meat tenderizing machine having a casing, a removable sectional meat tenderizer unit comprising a pair of frames separable from each other when removed from said casing, a pair of meat tenderizing rollers, means on each of said frames for rotatably supporting one of said rollers, means on said casing for supporting said unit, and cooperating means on said frames and on said casing for maintaining said unit in operative relation in said casing.

8. In a meat tenderizing machine having a casing, a removable sectional meat tenderizer unit comprising a pair of frames separable from each other when removed from said casing, a pair of meat tenderizing rollers, means on each of said frames for rotatably supporting one of said rollers, means on said casing for supporting said unit, and cooperating means on said frames and on said casing for securing and maintaining said frames in operative position in said casing, said cooperating means including parts carried by said unit and additional parts carried by said casing and interfitting with said frame parts in said operative position.

9. In a meat tenderizing machine having a casing, a removable sectional meat tenderizer unit comprising a pair of frames separable from each other when removed from said casing, a pair of meat tenderizing rollers, means on each of said frames for rotatably supporting one of said rollers, means on said casing for supporting said unit, projecting parts on each of said frame members, and means on said casing for receiving said projecting parts to secure and retain said unit in said operative position.

10. In a meat tenderizing machine having a casing, a removable sectional meat tenderizer unit comprising a pair of frames, a pair of meat tenderizing rollers, means on each of said frames for rotatably supporting one of said rollers, means at one end of said frames for aligning said end of said frames, and cooperating means on said frames and on said casing for receiving said unit and retaining said frames in operative position in said casing.

11. In a meat tenderizing machine having a casing, a removable sectional meat tenderizer unit comprising a pair of frames, a pair of meat tenderizing rollers, means on each of said frames for rotatably supporting one of said rollers, hinge means at one end of said frames for aligning and pivotally securing said frames to each other allowing the separation thereof, and cooperating means on the other ends of said frames and on said casing for receiving said unit and retaining said frames in operative position in said casing.

12. In a meat tenderizing machine having a casing, a removable sectional meat tenderizer unit comprising a pair of frames, a pair of meat tenderizing rollers, means on each of said frames for rotatably supporting one of said rollers, readily detachable means at one end of said frames for aligning said end of said frames, and cooperating means on said frames and on said casing for receiving said unit and retaining said frames in operative position in said casing.

13. A removable sectional meat tenderizer unit for a meat tenderizing machine comprising a pair of frames, a pair of meat tenderizing rollers, means on each of said frames for rotatably supporting one of said rollers, means at one end of said frames for aligning said end of said frames, a hand rail for each said frame extending lengthwise thereof, said hand rails being adapted to be grasped by the hand of the operator to hold said frames in closed position.

14. In a meat tenderizing machine having a casing and driving means, a removable sectional meat tenderizer unit comprising a pair of frames separable from each other when removed from said casing, a pair of meat tenderizing rollers, means on each of said frames for rotatably supporting one of said rollers, means on said casing for supporting said unit, at least one of said rollers having a readily detachable connection with said driving means for driving said unit when secured in said operative position, and cooperating means on said frames and on said casing for maintaining said frames in operative relation in said casing.

15. In a meat tenderizing machine having a casing, a removable sectional meat tenderizer unit comprising a pair of frames separable from each other when removed from said casing, a pair of meat tenderizing rollers, means on each of said frames for rotatably supporting one of said rollers, means on said casing for supporting said unit, and sets of cooperating means on both ends of said frames and on said casing for maintaining said frames in operative relation in said casing.

16. A sectional meat tenderizing unit including sections separable from each other, aligning means for said sections including a key at one end thereof leaving the other ends free, each of said sections having roller supporting means, a roller supported in each of said sections, and means at the free ends of said sections adapted to secure said free ends in operating alignment.

17. A sectional meat tenderizing unit including sections separable from each other, connecting means for said sections including a key at one end thereof leaving the other ends free, each of said sections having roller supporting means, a roller supported on each of said sections and having cutter discs and spacers mounted alternately thereon, a comb member for each roller, and means on each of said sections for supporting one of said combs each of said means being removable with its section.

18. A meat tenderizing unit comprising two sections including a pair of shafts, meat cutting discs mounted on said shafts in spaced relation, end frames supporting the ends of each of said shafts, clutch engaging means formed on at least one of said shafts, a key on one of said end frames, and a key receiving means in the other end frame to receive said key to align the sections one with the other and providing for direct pulling apart of said sections.

19. A tenderizing unit for a meat tenderizing machine comprising a pair of frames completely separable from each other, a roller mounted in each frame, a stripping comb for each roller mounted in each frame, readily attachable and detachable means on at least one end of said frames for attachment to said other frame, and means on at least one of said frames for driving said unit, each of said frames, rollers and combs forming a complete unit when separated from the other.

20. A meat tenderizing unit including sectional frame portions, a casing, hinge means connecting one end of said frame sections, lug receiving and supporting shoulders formed in said casing, lugs projecting from the free ends of said frame sections adapted to guide the free ends of said frames together into operative position against said shoulders, power driving means within said casing for said unit, processing rollers supported in said frame sections, a stripper for each roller supported in each frame section, clutch means formed in said casing and on the ends of said rollers for holding said frame sections together and operated by the power means within said casing adapted to separably connect the ends of said processing rollers when positioned in said casing, and hand rail means projecting along the upper portion of said frame sections for lifting said unit from said casing, said hand rail means forming a receiving chute for guiding material into said processing rollers, the sections of said unit swinging apart on said hinge means to separate the processing rollers from each other whereby said unit may be thoroughly cleansed.

ALDRICH L. JACKSON.

REFERENCES CITED

The following references are of record in the file of this patent:

UNITED STATES PATENTS

| Number | Name | Date |
|---|---|---|
| 311,199 | Moulton | Jan. 27, 1885 |
| 1,600,002 | Kingery | Sept. 16, 1926 |
| 2,163,123 | Huse | June 20, 1939 |
| 2,346,686 | Jackson | Apr. 18, 1944 |
| 2,450,688 | Richard | Oct. 5, 1948 |
| 2,513,025 | Jackson | June 27, 1950 |